(12) United States Patent
Torii (10) Patent No.: US 7,806,103 B2
(45) Date of Patent: Oct. 5, 2010

(54) INTEGRATED VALVE DEVICE

(75) Inventor: Katsuya Torii, Anjo (JP)

(73) Assignee: Denso Corporation, Kariya (JP)

( * ) Notice: Subject to any disclaimer, the term of this patent is extended or adjusted under 35 U.S.C. 154(b) by 191 days.

(21) Appl. No.: 11/889,196

(22) Filed: Aug. 9, 2007

(65) Prior Publication Data

US 2008/0035107 A1 Feb. 14, 2008

(30) Foreign Application Priority Data

Aug. 11, 2006 (JP) ............................. 2006-219616

(51) Int. Cl.
*F02D 9/10* (2006.01)
(52) U.S. Cl. .................... 123/336; 123/337; 29/890.08; 29/888.4
(58) Field of Classification Search ................................
123/184.21–184.27, 184.52–184.56, 336, 123/337, 400, 472, 190.9; 137/601.14–601.19, 137/204, 637.2–637.4; 701/103; 251/120, 251/280, 305, 518; 264/513; 29/890.08, 29/888.4; 180/219
See application file for complete search history.

(56) References Cited

U.S. PATENT DOCUMENTS

| | | | |
|---|---|---|---|
| 6,979,130 B1 | 12/2005 | Stangier et al. | |
| 7,305,959 B2 * | 12/2007 | Letourneau et al. | 123/184.38 |
| 2003/0131818 A1 * | 7/2003 | Gregoire | 123/184.21 |
| 2005/0279310 A1 * | 12/2005 | Kondo et al. | 123/184.21 |
| 2007/0144483 A1 * | 6/2007 | Torii et al. | 123/337 |

FOREIGN PATENT DOCUMENTS

| | | |
|---|---|---|
| DE | 195 04 256 | 9/2003 |
| GB | 2 391 907 | 2/2004 |

* cited by examiner

*Primary Examiner*—Michael Cuff
*Assistant Examiner*—Keith Coleman
(74) *Attorney, Agent, or Firm*—Nixon & Vanderhye PC (57) ABSTRACT

An integrated valve device includes a casing having cylindrical portions each defining therein a fluid passage. The fluid passage accommodates a valve being adapted to opening and closing the fluid passage. A shaft extends through the valves to manipulate positions of the valves all together. Each cylindrical portion has a pair of wall portions each opposed to corresponding one sidewall surface of each of the valves. The pair of wall portions is located in a range out of an open-close range between a full close position and a full open position of the valve. Each wall portion has a protrusion for supporting the valve by being in direct contact with corresponding one of the sidewall surfaces when the protrusions of the pair of wall portions interpose therebetween the valve.

17 Claims, 6 Drawing Sheets

INTEGRATED VALVE DEVICE

CROSS REFERENCE TO RELATED APPLICATIONS

This application is based on and incorporates herein by reference Japanese Patent Application No. 2006-219616 filed on Aug. 11, 2006.

FIELD OF THE INVENTION

The present invention relates to an integrated valve device having multiple valves for an internal combustion engine.

BACKGROUND OF THE INVENTION

For example, GB 2 391 907 A (JP-A-2004-060525) discloses an integrated valve device provided in an intake manifold of an internal combustion engine. The integrated valve device includes multiple valves connected via one shaft. Alternatively, for example, U.S. Pat. No. 6,979,130 B1 (JP-A-2003-509634) discloses an integrated valve device provided in an intake manifold of an internal combustion engine. The integrated valve device includes multiple valve units axially connected to define a predetermined distance adjacently therebetween. Each of the valve units includes one resin housing and one resin valve. Each resin valve is, for example, a butterfly valve having a plate-shaped valve members radially extending from the valve shaft toward radially both ends.

In such an integrated valve device, multiple valves are provided in intake passages of an intake manifold of an engine, and are arranged along a shaft (pin rod). The pin rod, which is a singular component, may be press-inserted into through holes of the valves, so that the valves are skewed with the pin rod. In this insertion, the valves may be axially biased to one side due to friction between the inner periphery defining the through hole and the outer periphery of the pin rod, and consequently, the valves may be eccentrically displaced in the intake passages.

In this condition, the clearances between the valves and the intake passages become nonuniform due to the eccentricity displacement of the valves. Consequently, leakage of intake air flows passing through the left and right side clearances become nonuniform when the valves are in a full close position to define a minimum opening in the intake passages. As a result, engine performance is lowered.

SUMMARY OF THE INVENTION

In view of the above and other problems, it is an object of the present invention to produce an integrated valve device having valves being properly arranged, with less manufacturing cost. It is another object of the present invention to produce a method for manufacturing the integrated valve device.

According to one aspect of the present invention, an integrated valve device includes a casing having a plurality of cylindrical portions each defining therein a fluid passage. The integrated valve device further includes a plurality of valves each accommodated in each of the plurality of cylindrical portions and being adapted to opening and closing the fluid passage. The integrated valve device further includes a shaft adapted to manipulating positions of the plurality of valves all together. Each of the plurality of valves has two sidewall surfaces with respect to a rotation axis thereof. Each of the plurality of valves substantially closes the fluid passage when being in a full close position. Each of the plurality of valves substantially entirely opens the fluid passage when being in a full open position. Each of the plurality of cylindrical portions has a pair of wall portions each opposed to corresponding one of the two sidewall surfaces of each of the plurality of valves, the pair of wall portions being in a range out of an open-close range between the full close position and the full open position. Each of the pair of wall portions has a protrusion for supporting corresponding one of the plurality of valves by being in contact with corresponding one of the sidewall surfaces when the protrusions of the pair of wall portions interpose therebetween the one of the plurality of valves.

According to another aspect of the present invention, an integrated valve device including a casing having a plurality of cylindrical portions each defining therein a fluid passage. The integrated valve device further includes a plurality of valves each accommodated in each of the plurality of cylindrical portions and being adapted to opening and closing the fluid passage. The integrated valve device further includes a shaft defining a rotation axis around which the plurality of valves are integrally rotatable. Each of the plurality of valves has two sidewall surfaces. Each of the plurality of cylindrical portions has two wall portions each opposed to corresponding one of the two sidewall surfaces of each of the plurality of valves. Each of the two wall portions has a protrusion for supporting corresponding one of the plurality of valves by being in contact with corresponding one of the sidewall surfaces, when the plurality of valves is in a range out of an open-close range between a full close position and a full open position of the plurality of valves.

According to another aspect of the present invention, a method for manufacturing an integrated valve device includes supporting of a plurality of valves respectively in a plurality of cylindrical portions each defining a fluid passage by interposing each of the plurality of valves between protrusions each projected from inner peripheries of each of the plurality of cylindrical portions, the plurality of valves being in a range out of an open-close range between a full close position and a full open position of the plurality of valves. The method further includes press-inserting of a shaft into an inner periphery defining a through hole of the plurality of valves along a rotation axis.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

An intake air control apparatus shown in FIGS. 1 to 4 is provided to a multicylinder internal combustion engine such as a four-cylinder engine of a vehicle. The intake air control apparatus is provided with an intake vortex generator capable of generating vertical vortex flow (tumble flow) in each cylinder of the multicylinder engine for facilitating combustion of mixture gas. The intake vortex generator is an integrated valve device constructed of multiple valves (first to fourth valves) 2 respectively provided to multiple valve units. The multiple valves 2 are provided in an intake manifold 1. The multiple valves 2 are arranged along a pin rod (shaft) 4 that extends to define a rotation center of the valves 2. The valves 2 are arranged in parallel with each other, and are distant at a predetermined distance from each other. The intake manifold 1 serves as a common casing of the multiple valves 2.

The engine has combustion chambers in which mixture of intake air and fuel is burned, thereby producing output power. The engine includes an intake duct (intake pipe) for supplying intake air into each combustion chamber of each cylinder of the engine. The engine further includes an exhaust duct (exhaust pipe) to discharge exhaust gas from each combustion chamber to the outside through a purification device.

The intake duct includes an air cleaner case, a throttle body, a surge tank, and the intake manifold 1. The air cleaner case accommodates an air cleaner for filtrating intake air. The throttle body is provided downstream of the air cleaner case with respect to intake air flow. The surge tank is provided downstream of the throttle body. The intake manifold 1 is provided downstream of the surge tank. The intake manifold 1 has a double-pipe structure.

The intake manifold 1 includes multiple polygonal cylindrical portions 5 and multiple housings 6. The polygonal cylindrical portions 5 respectively have first to fourth fitting holes therein. The housings 6 respectively have first to fourth intake passages 11 therein. The housings 6 are, for example, formed of resin. The intake manifold 1 serves as an intake manifold pipe. Intake air is distributed through the intake manifold 1, and the intake air flows though the polygonal cylindrical portions 5 to each intake port (not shown) of each cylinder of the engine. The intake port is provided to a cylinder head (not shown) of the engine. The intake manifold 1 is integrally formed of a resin material such as grass fiber reinforced thermoplastic.

In this embodiment, the polygonal cylindrical portion 5 of the intake manifold 1 define the first to fourth fitting holes 10 for respectively accommodating valve units therein. The polygonal cylindrical portions 5 have multiple partition walls for air tightly partitioning adjacent two fitting holes 10 therebetween. Specifically, one of the partition walls of the polygonal cylindrical portions 5 partitions the first fitting hole 10 from the second fitting hole 10, the second fitting hole 10 from the third fitting hole 10, or the third fitting hole 10 from the fourth fitting hole 10.

Figure 1A:
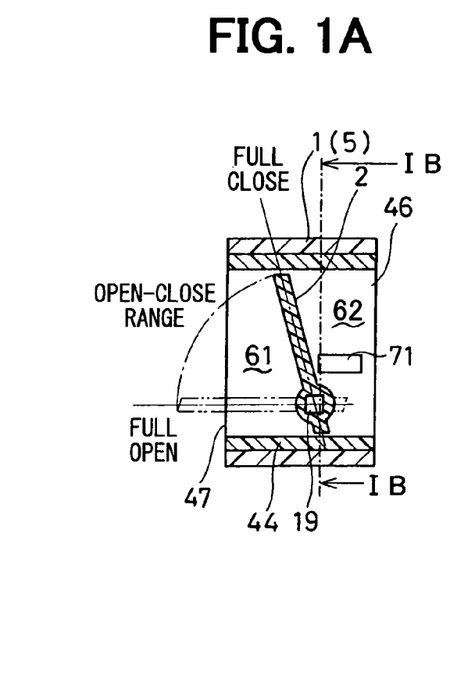
FIG. 1A is a sectional view showing an integrated valve device according to a first embodiment.
Figure 1B:
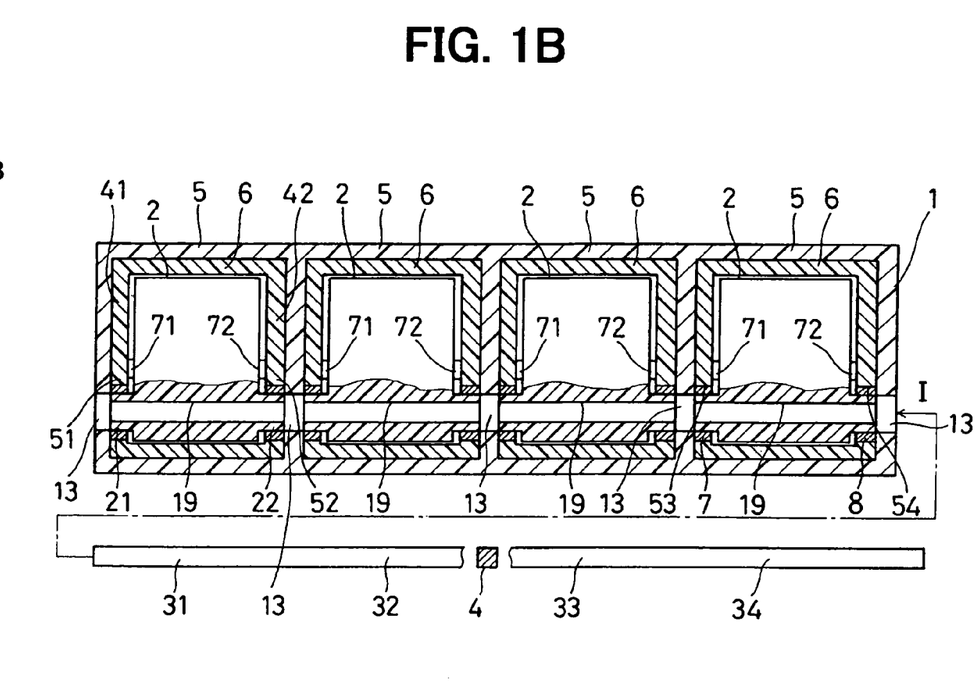
FIG. 1B is a sectional view taken along the line IB-IB in FIG. 1A.

The intake manifold 1 has through holes 13 extending straight from the leftmost sidewall of the cylindrical portions 5 to the rightmost sidewall of the cylindrical portions 5 in FIG. 1B. The through holes 13 extend perpendicularly to the flow direction of intake air passing through the intake passages 12. That is, the through holes 13 extend along a rotation shaft (pin rod 4) horizontally in FIG. 1B. The through holes 13 extend through all the fitting holes 10 and all the polygonal cylindrical portions 5 along an insertion direction I in FIG. 1B. The cylindrical portions 5 define the intake passages 11 therein, upstream of the fitting holes 10 of the intake manifold 1. Each intake passage 11 is connected with each cylinder of the engine. The housings 6 define intake passages 12 therein respectively connected to the cylinders of the engine. The intake passages 11, 12 are individually connected respectively with the intake ports of the cylinders of the engine.

The engine includes the cylinder head and a cylinder block (not shown). The cylinder head is air tightly connected with the downstream end of an intake duct. The cylinder block has a combustion chamber to which mixture gas flows from an intake port. The intake ports define three-dimensional intake passages in the cylinder head. The cylinder head is provided with sparkplugs (not shown) each having a tip end being exposed to the combustion chamber of each cylinder. The cylinder head is mounted with injectors (solenoid injection valve) each adapted to injecting fuel into each intake port of each cylinder of the engine. One side of the cylinder head defines multiple intake ports respectively opened and closed using poppet-type intake valves. The other side of the cylinder head defines multiple exhaust ports (not shown) respectively opened and closed using poppet-type exhaust valves.

In this embodiment, the intake vortex generator is an intake control valve module constructed of the valve units each having the resin housing rotatably accommodating the resin valve. The valve units are respectively provided in the fitting holes 10 of the intake manifold 1, and are arranged along the pin rod 4. The valve units are separated from each other at a regular distance. The number of the valve units corresponds to the number of the cylinders of the engine. The valve units are provided correspondingly to the intake ports of the cylinders of the engine. In this embodiment, the valve units are arranged from the tip end of the pin rod 4 toward the rear end of the pin rod 9, in order, along the insertion direction I of the pin rod 4.

The intake duct defines intake passages individually connected with the cylinders of the engine. The valve units are integrated with the intake manifold 1 defining a downmost stream portion of the intake duct. The valve units include the valves 2, an actuator 3, the pin rod 4, and the housings 6. The valves 2 are provided correspondingly to the cylinders of the engine. The actuator 3 is adapted to simultaneously manipulating all the valves 2. The single pin rod 4 connects the valves 2 such that the valves 2 are skewered with the pin rod 4. The housings 7 respectively accommodate the valves 2. The valves 2 are rotatable to respectively open and close the housings 6.

Figure 2:
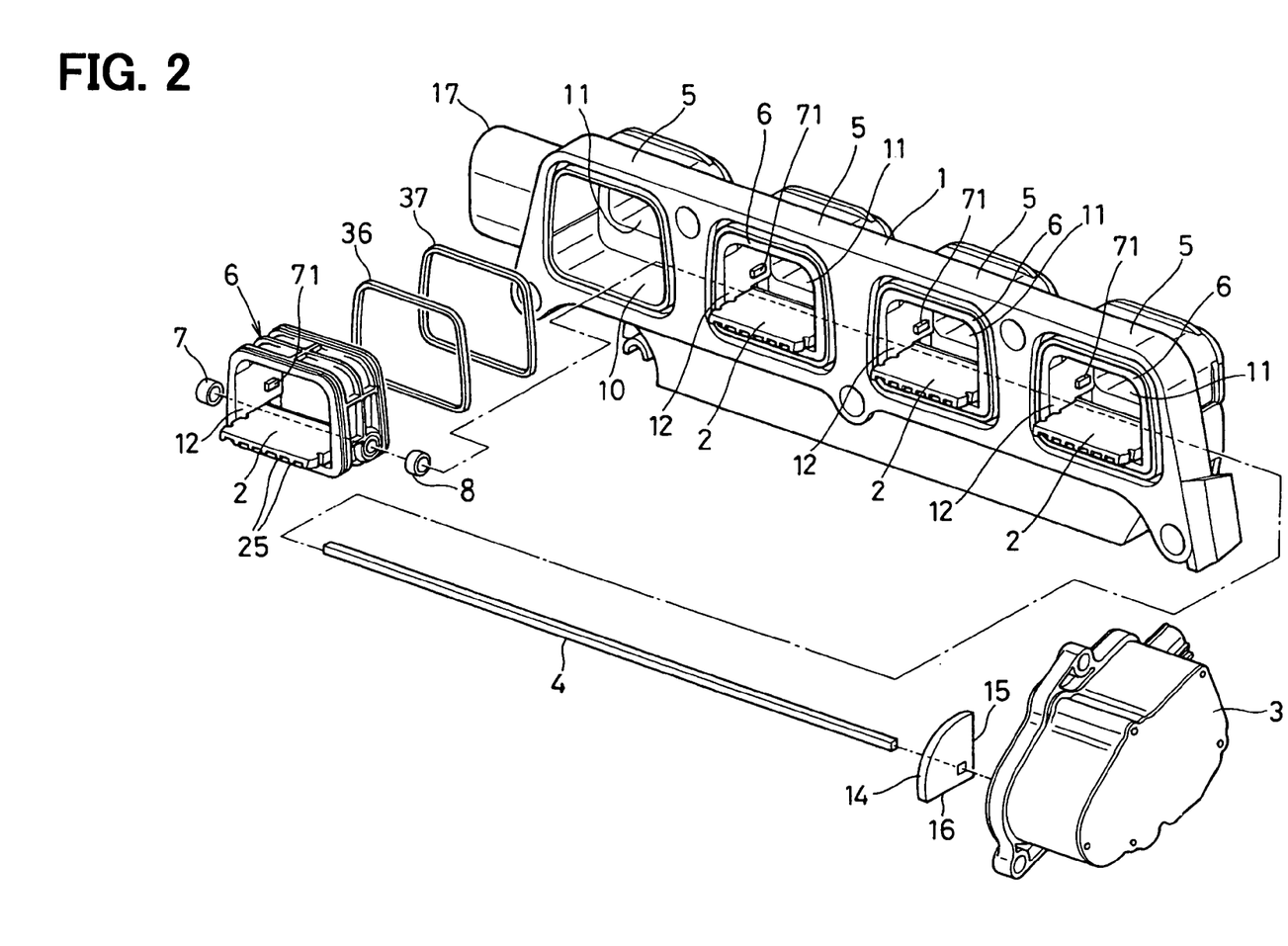
FIG. 2 is an exploded perspective view showing the integrated valve device.

As shown in FIG. 2, the actuator 3 is an electric actuator having a power unit constructed of an electric motor (not shown) and a transmission device such as reduction gears (not shown). The electric motor generates output torque when being supplied with electricity. The transmission device transmits rotation of a motor shaft of the electric motor to the pin rod 4.

The electric motor may be a DC motor such as a brushless motor or a motor with a brush. The electric motor may be an AC motor such as a three-phase-current motor. The reduction gears construct the transmission device for reducing rotation speed of the motor shaft of the electric motor at a predetermined reduction ratio, and transmitting the reduced output torque of the electric motor to the pin rod 4. The reduction gears include a motor gear, an intermediate gear, and a final gear, which are rotatably accommodated in an actuator case. The motor gear is secured to the motor shaft of the electric motor. The intermediate gear is engaged with the motor gear. The final gear is engaged with the intermediate gear.

The actuator 3 has a shaft (not shown) connected with an end portion of the pin rod 4 on the side of the actuator 3 via a coupling member (not shown). The shaft of the actuator 3 is loosely fitted to the coupling member. A stopper 14 is provided to the end of the pin rod 4 in the vicinity of the actuator 3 for regulating the valve position at a full close position.

The shaft has fitting portions defining valve support portions to which valves are respectively fitted The shaft has an end extending out of the fitting portions toward the actuator 3. The end of the shaft has the outer periphery provided with the stopper 14. The stopper 14 includes a full close stopper portion 15 and a full open stopper portion 16. The full close stopper portion 15 is hooked to a full close stopper member (full close stopper screw, not shown) when all the valves 2 are in the full close position. The full open stopper portion 16 is hooked to a full open stopper member (full open stopper screw, not shown) when all the valves 2 are in the full open position.

The full close stopper member is fixed to a full close stopper (not shown) provided to an outer wall of the cylindrical portion 5 of the intake manifold 1 on the right side in FIG. 1B. The full open stopper member is fixed to a full open stopper (not shown) also provided to the outer wall of the cylindrical portion 5 of the intake manifold 1 on the right side in FIG. 1B. In this structure, all the valves 2 are in the full close position in a condition where the full close stopper portion 15 of the stopper 14 is hooked to the full close stopper member. All the valves 2 are in the full open position in a condition where the full open stopper portion 16 of the stopper 14 is hooked to the full open stopper member.

The valve actuator device, in particular, the electric motor is controlled in accordance with electricity supply controlled using an engine control unit (ECU). The ECU controls electricity supplied to the electric motor in accordance with an operating condition of the engine such as engine rotation speed, the throttle position, the accelerator position, and a target intake amount. In this operation, the ECU is capable of controlling the positions of all the valves 2 throughout a valve operation range from the full close position to the full open position through an intermediate position.

When all the valves 2 are in the full close position, each of the valves 2 and the wall surface of the intake passage 12 in the housing 6 define a minimum gap therebetween, so that the amount of intake air passing through the intake passages 12 becomes minimum. When all the valves 2 are in the full open position, each of the valves 2 and the wall surface of the intake passage 12 in the housing 6 define a maximum gap therebetween, so that the amount of intake air passing through the intake passages 12 becomes maximum. The outer wall of the cylindrical portion 5 of the intake manifold 1 on the left side in FIG. 1B is provided with a casing 17 (FIG. 2) for accommodating a spring (not shown). The spring applies force to the pin rod 4 to reduce a gap in the connection in which the shaft of the actuator 3 is fitted to the coupling member.

The valves 2 are formed of a resin material such as grass fiber reinforced thermoplastic to be in a predetermined shape. The valves 2 have a rotation center perpendicularly to the center axis of each housing 6. The valves 2 are skewered with the pin rod 4 as a single member to construct a rotary valve. The valves 2 construct a tumble flow control valve device for generating vortex flows (tumble flows) in intake air flowing into the combustion chambers of the cylinders of the engine. The valves 2 are rotated in the operation range between the full close position and the full open position, so that the valves 2 open and close the intake passages 12 of the housings 6. The amount of intake air flowing through each intake passage 12 becomes minimum when the valves 2 are in the full close position. The amount of intake air flowing through each intake passage 12 becomes maximum when the valves 2 are in the full open position.

Each of the valves 2 defines a through hole 19 extending along the pin rod 4. Each of the valves 2 has cylindrical valve shafts 21, 22, which circumferentially define the through hole 19, and a plate-shaped valve member, which radially extends from a rotation center of each of the valve shafts 21, 22. The valve member extends perpendicularly to the rotation center, i.e., rotation axis.

The through hole 19 of each of the valves 2 is a polygonal hole, such as a rectangular hole, defining a press-insertion hole straightly extending perpendicularly to the center axis of each intake passage 12 of the housing 6. The through hole 19 axially extends in each of the valve shafts 21, 22.

Each valve member of the valves 2 is in a rectangular shape having the upper and lower sides, which are greater or less than the right and left sides thereof in FIG. 1B. The valves 2 are rotatably accommodated in the housings 6 respectively defining the intake passages 12. Each of the valves 2 has four corners each having a chamfer being in one of a square shape, an arc shape, and an R shape, for example.

Each valve member of the valves 2 has the upper periphery having a center portion defining a main opening portion (notch, slit) 23 in a substantially rectangular shape for generating vortex intake flow (tumble flow) in intake air flowing into the combustion chamber of each cylinder of the engine when the valves 2 are in the full close position. That is, the main opening portion 23 is defined by the upper periphery of each valve member opposed to the upper wall portion of the housing 6. The main opening portion 23 may not be provided. Each valve member of each of the valves 2 has both sides partially have four sub-openings (notch slit) 24 each having an opening area less than that of the main opening portion 23. The sub-openings 24 may not be provided.

Each valve member has a front surface and a back surface. The back surface of the valve member is provided with reinforcing ribs 25 each having the height gradually decreasing from the valve shafts 21, 22 toward the tip end of the valve member. The reinforcing ribs 25 may not be provided.

Each of the valve shafts 21, 22 provided with each of the valves 2 is in a substantially cylindrical shape circumferentially surrounding each of valve support portions 31 to 34 of the pin rod 4. The valve shafts 21, 22 respectively have axial ends respectively defining sliding portions (sliding surfaces) slidably supported by the inner periphery of each housing 6 respectively via two bearings 7, 8. Each of the valve shafts 21, 22 is arranged offset from the center axis of each intake passage 12 toward the lower wall surface. Each of the valve shafts 21, 22 is arranged offset from the center of each intake passage 12 toward the upstream of the intake air flow.

In this structure, each of the valve shafts 21, 22 is located in the vicinity of the upstream opening of each housing 6, and is located in the vicinity of the lower wall surface of each housing 6. When each of the valves 2 is in the full open position, the back surface of the valve member of each of the valves 2 is opposed to the lower wall surface of the lower wall portion of each housing 6, and defines a minimum gap therebetween.

In addition, when each of the valves 2 is in the full close position, each of the valve shafts 21, 22 of each of the valves 2 is eccentrically located on the lower side in FIG. 1B, i.e., on one side of the surface of the valve member extending perpendicular to the thickness direction of the valve member. In this structure, each of the valves 2 has the valve shafts 21, 22 defining the rotation center on the opposite side of the free end, and constructs a cantilever structure.

The valves 2 are in the full close position when the engine is cool in a start condition or when the vehicle is in an idling condition where the amount of intake air is small. When the valves 2 are in the full close position, each of the valves 2 is inclined at the predetermined angle toward the valve-open direction around a rotation axis perpendicular to the axis of each intake passage 12.

The valves 2 are in the full-open position when the engine is operated at middle or high rotation speed. When the valves 2 are in the full open position, the front and back surfaces of each of the valves 2 extend substantially along the axis of each intake passage 12. When the engine is operated at the low rotation speed and a large amount of intake air is required, the valves 2 may be controlled at an intermediate position in which the valves 2 are rotated slightly from the full close position toward the valve-open direction.

In this embodiment, the pin rod 4 is a shaft formed of metal such as a ferrous material to be in a polygonal shape in cross section. The pin rod 4 is inserted into each through hole 19 of each of the valves 2. The pin rod 4 has fitting portions (valve support portions) 31 to 34 each supporting corresponding valve shafts 21, 22 at a predetermined mount angle.

The shape of each through hole 19 corresponds to the rectangular cross section of the pin rod 4. That is, the shape of each through hole 19 is substantially the same as the rectangular cross section of each of the valve support portions 31 to 34 of the pin rod 4. In this structure, the valves 2 can be restricted from rotating relatively to the pin rod 4.

The pin rod 4 is fitted, e.g., press-inserted into each through hole 19 of each of the valves 2. The valve shafts 21, 22 of the valves 2 are skewered with the pin rod 4 serving as singular driving shaft for integrally supporting the valves 2. The pin rod 4 straightly extends along the rotation axis, and has the polygonal cross section. The pin rod 9 includes the valve support portions 31 to 34 press-inserted into the inner periphery of each of the valve shafts 21, 22 of each of the valves 2. The valve support portions 31 to 34 are provided respectively to the valves 2 of the valve units.

Specifically, the valve support portion 31 serves as a first fitting portion being press-fitted into the inner peripheries of the valve shafts 21, 22 of a first valve 2 of the valves 2. The first valve 2 is the one most distant from the stopper 14. The valve support portion 31 defines the angle of the first valve 2 at a predetermined mount angle. The valve support portion 32 serves as a second fitting portion being press-fitted into the inner peripheries of the valve shafts 21, 22 of a second valve 2 of the valves 2. The second valve 2 is the one secondarily distant from the stopper 14. The valve support portion 32 defines the angle of the second valve 2 at a predetermined mount angle. The valve support portion 33 serves as a third fitting portion being press-fitted into the inner peripheries of the valve shafts 21, 22 of a third valve 2 of the valves 2. The third valve 2 is the one secondarily in the vicinity of the stopper 14. The valve support portion 33 defines the angle of the third valve 2 at a predetermined mount angle. The valve support portion 34 serves as a fourth fitting portion being press-fitted into the inner peripheries of the valve shafts 21, 22 of a fourth valve 2 of the valves 2. The fourth valve 2 is the one in the most vicinity of the stopper 14. The valve support portion 34 defines the angle of the fourth valve 2 at a predetermined mount angle.

The pin rod 4 having the polygonal cross section may not be smoothly rotated in a structure in which each bearing hole of each bearing portion of the housing 6 directly supports the pin rod 4. Therefore, the valve shafts 21, 22 of the valves 2 cover the pin rod 4, and the outer circumferential peripheries of the valve shafts 21, 22 are rotatably supported by the housing 6 via the bearings 7, 8.

The housings 6 are integrally formed of a resin material such as grass fiber reinforced thermoplastic to be in a rectangular shape. The intake manifold 1, the valves 2, and the housings 6 are formed of thermoplastic resin, which is preferably polyamide resin (PA), unsaturated polyester resin (UP), polyphenylene sulfide (PPS), polybutylene terephthalate (PBT), or the like, in view of thermostability and mechanical strength.

The housings 6 respectively accommodate the valves 2 to be rotatable therein. Each of the housings 6 rotatably supports both axial ends of the valve shafts 21, 22 respectively via the bearings 7, 8. The valve shafts 21, 22 define the rotation center of each of the valves 2. Each housing 6 is elastically supported in each fitting hole 10 of the intake manifold 1 via two gaskets 36, 37. The gaskets 37, 37 serve to tightly seal the annular gap between the wall surface defining each fitting hole 10 in the intake manifold 1 and the outer periphery of each housing 6. The gaskets 36, 37 also serve to damp vibration transmitted from the engine to each housing 6 via the intake manifold 1. Each of the gaskets 36, 37 is a rectangular loop-shaped elastic member formed of an oil-resistive rubber material such as chloroprene rubber (CR) and nitrile-butadiene rubber (NBR).

Each housing 6 is a polygonal cylindrical member accommodating each of the valves 2 adapted to opening and closing the passage in each housing 6. Each housing 6 defines the polygonal cylindrical member on the inner side of the intake manifold 1 having a double-pipe structure.

Each housing 6 has left and right wall portions 41, 42 on the left and right sides. The left and right wall portions 41, 42 are opposed relative to a horizontal direction perpendicular to the intake air flow passing along the axial direction of the intake passage 12. The left and right wall portions 41, 42 define opposed wall portions. Each housing 6 has upper and lower wall portions 43, 44 on the upper and lower sides. The upper and lower wall portions 43, 44 are opposed relative to a vertical direction perpendicular to the intake air flow passing along the axial direction of the intake passage 12.

The length of each of the upper and lower wall portions 43, 44 are less than the length of each of the left and right wall portions 41, 42. Alternatively, the length of each of the upper and lower wall portions 43, 44 may be greater than the length of each of the left and right wall portions 41, 42. Each housing 6 has four corners each having a chamfer being in an arc shape or an R shape. The four corners of each housing 6 may be in a square shape. The outer periphery of each housing 6 defines reinforcing ribs 45 each extending circumferentially on the housing 6 or in parallel with the intake air flow. The reinforcing ribs 45 may not be provided.

Each valve unit has each housing 6 connected with each intake passage 11 of the intake manifold 1. Each valve unit has one of the first to fourth intake passages 12 correspondingly connected with each intake port of the cylinder head. Each housing 6 therein defines the intake passage 12 in a substantially rectangular shape. The intake passages 12 are located downstream of the intake passages 11 of the intake manifold 1, and are respectively communicated with the combustion chambers of the cylinders of the engine respectively through the intake ports. Each housing 6 has an inlet 46 and an outlet 47. The inlet 46 defines an opening in the upstream end of the intake passage 12, and communicates with the intake passage 11 of the intake manifold 1. The outlet 47 defines an opening in the downstream end of the intake passage 12, and communicates with the intake port of the engine.

The surface of the left wall portion 41 and the surface of the right wall portion 42 are opposed to each other to define the intake passage 12 therebetween. The left and right wall portions 41, 42 of the housing 6 respectively define cylindrical bearing portions 51, 52 opposed to each other via the intake passage 12. The bearing portions 51, 52 respectively has bearing holes 53, 54 rotatable respectively relative to the valve shafts 21, 22 provided to each of the valves 2. Two bearings 7, 8 are fitted, e.g., press-inserted respectively to the inner peripheries defining the bearing holes 53, 54 in the bearing portions 51, 52. The bearings 7, 8 are integrally formed of a resin material or a metallic material to be in substantially cylindrical shapes. The valve shafts 21, 22 are provided to each of the valves 2. Each of the bearings 7, 8 has a sliding hole slidable relative to one of the valve shafts 21, 22 each defining an axial end of the valve 2.

The intake passage 12 has the center axis passing through the center of the intake passage 12 horizontally in FIG. 1A. Each bearing portion 51, 52 and each bearing hole 53, 54 are offset toward the lower wall portion 44 of the housing 6 with respect to the center axis of the intake passage 12. Each bearing portion 51, 52 and each bearing hole 53, 54 are offset toward the upstream of the intake air with respect to the center of the intake passage 12. Each bearing portion 51, 52 and each bearing hole 53, 54 are located in the vicinity of the upstream opening of each housing 6, and are located in the vicinity of the lower wall portion 44 of each housing 6.

The left and right wall portions 41, 42 of the housing 6 has a pair of sidewall surfaces (first opposed surfaces, first passage wall surfaces) 61, each being opposed to corresponding one of left and right wall surfaces of each of the valves 2 via a predetermined clearance (side clearance). Each of the sidewall surfaces 61 is opposed to corresponding one of the left and right wall surfaces of each of the valves 2 throughout an open-close range between the full close position and the full open position of the valves 2. The left and right wall portions 41, 42 of the housing 6 has a pair of sidewall surfaces (second opposed surfaces, second passage wall surfaces) 62, each being opposed to corresponding one of left and right wall surfaces of each of the valves 2 via a predetermined clearance (side clearance on both axial sides of each valve 2). Each of the sidewall surfaces 62 is opposed to corresponding one of the left and right wall surfaces of each of the valves 2 in an out-range, which is out of the open-close range between the full close position and the full open position of the valves 2.

The open-close range between the full close position and the full open position of the valves 2 may be an operative range in which each valve 2 is rotated when the integrated valve device is in, for example, a normal condition where the valves 2 are operated to control the intake air flow, after the integrated valve device including the valves 2 is provided to the vehicle. That is, the valves 2 may be supposed to be operated within the open-close range in the normal condition. The valves 2 are capable of being rotated in the out-range in, for example, the manufacturing process thereof.

The pair of sidewall surfaces 62 is in the vicinity of the inlet 46 upstream of the intake air relative to the pair of sidewall surfaces 61. The pair of sidewall surfaces 62 is provided with protrusions 71, 72 each extending substantially straight from a vertical line, which is perpendicular to the rotation axis of the valve 2, toward the inlet 46.

The protrusion 71 is integrally formed of resin with the sidewall surface 62 of the left wall portion 41 in each of the valves 2. The protrusion 72 is integrally formed of resin with the sidewall surface 62 of the right wall portion 42 in each of the valves 2. The left and right wall portions 41, 42 are substantially rectangular, and respectively provided with the protrusions 71, 72 each being in a substantially box shape, for example. Each of the protrusions 71, 72 defines a thick portion together with each of the left and right wall portions 41, 42. Each of the protrusions 71, 72 has the thickness greater than the thickness of each of the left and right wall portions 41, 42 around the protrusions 71, 72. Each of the outer wall surfaces of the left and right wall portions 41, 42 may have a recess correspondingly to each of the protrusions 71, 72.

Each of the sidewall surfaces 61, 62 of the left and right wall portions 41, 42 and each of the left and right sidewall surfaces of the valve 2 therebetween define the side clearance. Each of the protrusions 71, 72 of the left and right wall portions 41, 42 has the height determined to be capable of substantially uniformize the side clearance between each sidewall surface 61, 62 of one of the left and right wall portions 41, 42 and each sidewall surface of the valve 2. The protrusions 71, 72 are respectively projected from reference lines, which respectively extend through the sidewall surfaces 61, 62 of the left and right wall portions 41, 42 along the center axis of the intake passage 12, toward the center axis of the intake passage 12. The protrusions 71, 72 are respectively projected from the reference lines, which respectively extend through the sidewall surfaces 61, 62 of the left and right wall portions 41, 42 along the center axis of the intake passage 12, to reduce the sectional area of the intake passage 12. The protrusions 71, 72 serve as latching portions for respectively supporting valve members of the valves 2 in an assembling work where the valves 2 are fitted with, e.g., press-inserted with the pin rod 4. Specifically, the protrusions 71, 72 are respectively in contact with the left and right wall surfaces of each valve 2 to interpose the valve 2 therebetween, thereby supporting the valve 2 in the assembling work, so that the supported valves 2 are skewered with the singular pin rod 4.

Next, a manufacturing method for the integrated valve device is described with reference to FIGS. 1 to 4.

First, the valves 2 and the housings 6 are formed by injection molding in an injection molding process. Next, the valve units, each of which includes each valve 2 rotatably accommodated in each intake passage 12 of each housing 6, are respectively assembled into the fitting holes 10 of the intake manifold 1 in a first assembling process. In this structure, the valve units are arranged in parallel along the pin rod 4, which defines the rotation axis, at a predetermined distance from each other.

Each of the valve shafts 21, 22 of each valve 2 has the axial end defining a slidable portion. The axial end of each valve shaft 21, 22 is fitted to corresponding one of the bearing holes 53, 54 of the housing 6. Each of the bearings 7, 8 is assembled into a substantially cylindrical clearance between the outer circumferential periphery of each valve shaft 21, 22 of each valve 2 and the inner circumferential periphery defining each bearing hole 53, 54, in a second assembling process. Each valve 2 is rotatable around the axial center of each valve shaft 21, 22. Each through hole 19 of each valve 2 is substantially coaxial with each through hole 13 of each cylindrical portion 5 of the intake manifold 1.

Subsequently, each valve 2 is rotated around the axial center of the valve shafts 21, 22 in the clockwise direction in FIG. 4A, so that the left and right wall surfaces of the valve 2 respectively make contact with the tip end surfaces of the protrusions 71, 72 of each housing 6. Thus, each valve 2 is interposed and supported between the protrusions 71, 72 in a condition where the valve 2 is in the out-range, which is out of the open-close range. In this condition, each valve 2 is in the valve position when being assembled with the pin rod 4.

Next, as shown in FIG. 1B, the pin rod 4 is inserted from the through hole 13 of the sidewall of the cylindrical portion 5 of the intake manifold 1 on the right side in FIG. 1B into the through hole 19 of the fourth valve 2. The pin rod 4 further passes through the through hole 13 of the sidewall of the cylindrical portion 5 into the through hole 19 of the third valve 2. The pin rod 4 further passes through the through hole 13 of the sidewall of the cylindrical portion 5 into the through hole 19 of the second valve 2. The pin rod 4 further passes through the through hole 13 of the sidewall of the cylindrical portion 5 into the through hole 19 of the first valve 2. Finally, the pin rod 4 further passes through the sidewall of the cylindrical portion 5 of the intake manifold 1 on the left side in FIG. 1B. The above insertion of the pin rod 4 is performed in a third assembling process.

The inner diameter of each through hole 19 of each valve 2 may be slightly less than the outer diameter of each support portion 31 to 34 of the pin rod 4. In this structure, the support portions 31 to 34 of the pin rod 4 are respectively press-fitted to the inner peripheries of the valves 2. Thus, the valves 2 are respectively integrated with the support portions 31 to 34 of the pin rod 4 such that the valves 2 are capable of integrally rotating around the pin rod 4.

Subsequently, each valve 2 being in the out-range and supported between the protrusions 71, 72 is rotated around the valve shafts 21, 22 in the anticlockwise direction in FIG. 1A. Thus, each valve 2 is over-turned from the out-range into the open-close range through the full close position, in a fourth assembling process.

In the above manufacturing processes, the valves 2 are skewered and fixed with the pin rod 4 in a condition where the valves 2 are restricted in the predetermined rotative position. In this condition, each valve 2 has a left side clearance δl, which is on the left side with respect to the rotation axis, and a right side clearance δr, which is on the right side with respect to the rotation axis. In the above structure and method, the left side clearance δl and the right side clearance δr are substantially uniformized to satisfy δl÷δr, that is, the left side clearance δl becomes substantially equal to the right side clearance δr. Thus, each valve 2 can be aligned to have substantially uniform clearances on both right and left sides thereof, without respectively inserting shims on both right and left sides.

The left side clearance δl, which is on the left side with respect to the rotation axis, is a gap between the left surface of each valve 2 and the left wall portion 41 of the corresponding housing 6. The right side clearance δr, which is on the right side with respect to the rotation axis, is a gap between the right surface of each valve 2 and the right wall portion 42 of the corresponding housing 6.

Next, operations and effects of the intake vortex generator of the integrated valve device are described with reference to FIGS. 1 to 4.

The ECU controls electricity supplied to the electric motor in a normal operating condition where a large amount of intake air is required and the engine is heated. In this condition, the electric motor rotates the valves 2 toward the valve-open direction. Thus, the electric motor controls all the valves 2 at the full open position.

In this condition, intake air flows from the intake passages 11 of the intake manifold 1 of the engine into the intake passages 12 of the housings 6 of the valve units through the inlets 46 of the housings 6. The intake air further flows from the outlets 47 of the housings 6 into the intake ports of the cylinder head 8 of the engine straightly through the housings 7. The intake air flows from the intake valves into the combustion chambers of the engine after passing through the intake ports. In this condition, each combustion chamber does not generate therein intake vortex flow (vertical tumble flow).

Alternatively, the ECU also controls electricity supplied to the electric motor in a starting operation or in an idling condition where the amount of intake air is small and the engine is cold. In this condition, the electric motor rotates the valves 2 toward the valve-close direction. Thus, the electric motor controls all the valves 2 at the full close position.

In this condition, intake air flows from the intake passages 11 of the intake manifold 1 of the engine into the intake passages 12 of the housings 6 through the inlets 46 of the housings 6. The intake air passes substantially only through the main opening portions 23, and enters into upper regions of the intake ports through the outlets 47 of the housings 6. The intake air flows along the upper wall surface of the intake ports. The intake air flows into the combustion chambers of the engine through the intake valves after passing along the upper wall surface of the intake ports.

In this condition, each combustion chamber generates therein tumble flow, thereby enhancing the combustion efficiency therein in the starting operation or in the idling condition of the engine. Thus, fuel consumption is reduced, and emission such as hydrocarbon (HC) can be reduced.

In this structure, the upper peripheries of the valves 2 define the main opening portions 23, and fuel such as gasoline may accumulate around the valves 2. When fuel accumulates around the valves 2, and the accumulating fuel flows into the combustion chambers due to, for example, inclination of the vehicle, the combustion chambers may cause incomplete combustion.

In the intake vortex generator, the combustion efficiency can be enhanced in the combustion chambers of the cylinders of the engine by generating vortex flow in intake air entering the combustion chambers of the cylinders of the engine in the starting operation or in the idling condition of the engine. The intake vortex generator has the following structure to generate tumble flow in the combustion chambers in the condition where the amount of intake air is small and the engine is cold. When the valves 2 are in the full close position, sub-intake air flow passes into each intake port through four of the sub-openings 24 in each of the valves 2, thereby canceling both main intake air flow passing through the main opening portions 23 of the valves 2 and a part of main intake air flow, which turns to return around the main opening portions 23. In this operation, fuel can be restricted from accumulating around the valves 2.

The ECU also controls electricity supplied to the electric motor when an ignition switch is turned OFF. Thus, the electric motor controls all the valves 2 at the intermediate position in which the valves 2 are rotated slightly from the full close position toward the valve-open direction. The ECU terminates supplying of electricity to the electric motor when all the valves 2 are rotated at the intermediate position.

When the engine is operated at the low rotation speed and a large amount of intake air is required, all the valves 2 may be controlled at the intermediate position by supplying electricity to the electric motor to generate tumble flow, even in a condition where the engine is operated. In this operation, tumble flow is generated with increase in the amount of intake air flowing into the combustion chambers of the engine. Therefore, combustion efficiency is enhanced in the combustion chambers when the engine is operated at the low rotation speed, so that fuel consumption is reduced, and emission such as hydrocarbon (HC) can be reduced.

Figure 7:
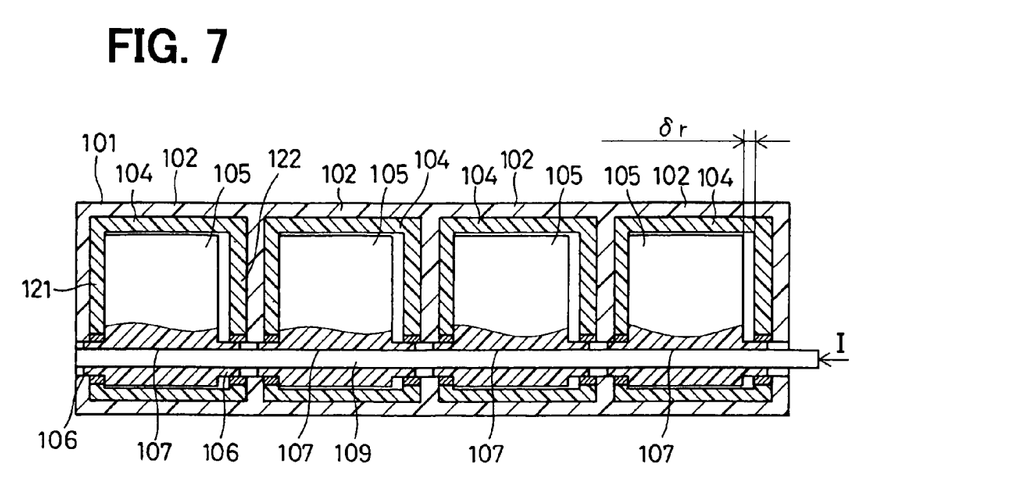
FIG. 7 is a sectional view showing an integrated valve device according to a comparative example.
Figure 8A:
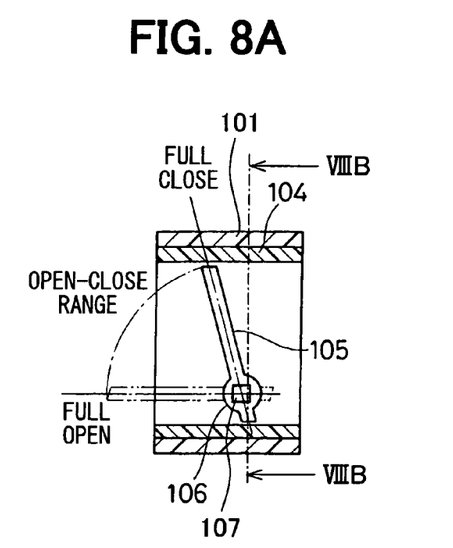
FIG. 8A is a sectional view showing the integrated valve device being provided with shims according to the comparative example.
Figure 8B:
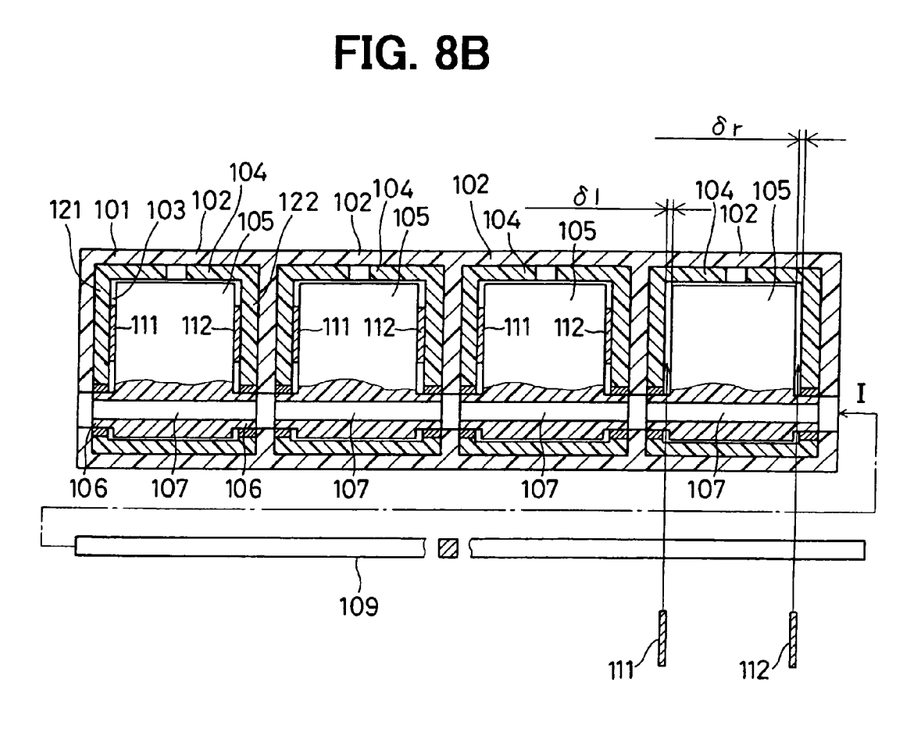
FIG. 8B is a sectional view taken along the line IB-IB in FIG. 8A.

As follows, a comparative example shown in FIGS. 7 to 8B is described. In this structure of a comparative example shown in FIGS. 7 to 8B, each valve unit includes a valve having a cantilever structure. The valve units are provided in an intake manifold of an engine, and are arranged along a pin rod.

The intake manifold 101 includes multiple polygonal cylindrical portions 102 and multiple resin housings 104. The polygonal cylindrical portions 102 respectively have accommodating spaces for the valve units therein. The resin housings 104 respectively have intake passages therein. The valve units respectively include resin housings 104 and resin valves 105. The resin valve 105 has a cantilever structure. Specifically, the resin valve 105 includes a valve shaft 106 defining a rotation center of the resin valve 105. The valve shaft 106 is eccentrically arranged on the lower side in FIG. 8B with respect to the surface of the valve.

The resin valves 105 respectively have through holes 107 extending through the valve shafts 106 along the rotation axis. The resin valves 105 are connected with each other via a pin rod 109, which serves as a shaft having a cross section in a polygonal shape. The pin rod 109 is inserted into the through holes 107 of the resin valves 105. In this structure, the resin valves 105 are skewed with the pin rod 109. Each through hole 107 also has a cross section in a polygonal shape, correspondingly to the cross section of the pin rod 109.

However, in this structure of comparative example shown in FIGS. 7 to 8B, the resin housings 104 and the resin valves 105 are respectively assembled into the cylindrical portions 102 of the intake manifold 101, and subsequently, the singular pin rod 109 is inserted into the through holes 107 of the resin valves 105. The singular pin rod 109 is, for example, press-inserted into the inner peripheries defining the through holes 107 in the valve shafts 106 of the resin valves 105. In this insertion, as shown in FIG. 7, the resin valves 105 are connected with the outer periphery of the pin rod 109 in a condition where the resin valves 105 are eccentrically displaced in intake passages 103 of the resin housings 104 toward the tip end of the pin rod 109. When shims 111, 112 shown in FIG. 8 are not used, the pin rod 109 is assembled to the resin valves 105 in a condition where the resin valves 105 are eccentrically displaced.

In this condition, each resin valve 105 has a left side clearance δl, which is on the left side with respect to the wall surface of a wall portion 121, and a right side clearance δr, which is on the right side with respect to the wall surface of a wall portion 122. In this structure, the left side clearance δl and the right side clearance δr become nonuniform due to the eccentrically displacement of the resin valves 105. Consequently, leakage of intake air flows passing through the left side clearance δl and the right side clearance δr become nonuniform when the resin valves 105 are in a full close position to define a minimum opening in the intake passages 103. As a result, engine performance is lowered.

Alternatively, referring to FIG. 8, shims 111, 112 may be used to restrict the resin valves 105 from being eccentrically displaced in the integrated valve device. Specifically, as shown in FIG. 8, shims 111, 112 each having a predetermined thickness may be respectively inserted into the clearances between each resin housing 104 and each resin valve 105. In this condition, the pin rod 109 is press-inserted into the valve shafts 106 of the resin valves 105, so that the resin valves 105 can be respectively restrained within proper positions relative to the resin housings 104 and the pin rod 109. The thickness T of the shim 111 is substantially equal to the left side clearance δl, and the thickness T of the shim 112 is substantially equal to the right side clearance δr.

In this structure, the left side clearance δl, which is on the left side of each resin valve 105 with respect to the wall surface of the wall portion 121, and the right side clearance δr, which is on the right side of each resin valve 105 with respect to the wall surface of the wall portion 122, can be substantially uniformized to satisfy δl÷δr. That is, the left side clearance δl becomes substantially equal to the right side clearance δr.

However, in this structure, the shim 111, 112 need to be assembled to the left and right side clearances between each resin valve 105 and each resin housing 104, in advance of inserting of the pin rod 109 into the resin valves 105. In addition, the shim 111, 112 need to be removed from the left and right side clearances between each resin valve 105 and each resin housing 104, after inserting of the pin rod 109 into the resin valves 105, because the shims 111, 112 cause friction relative to the resin valves 105.

Accordingly, in this structure, the shims 111, 112 need to be assembled to the resin valves 105, and need to be removed from the resin valves 105, in addition to the assembling work for fitting the valve units to the intake manifold 101. As a result, the manufacturing work of the integrated valve device becomes complicated, and the manufacturing cost of the integrated valve device increases. Thus, the productivity of the integrated valve device is lowered. In addition, in this structure, when the resin valves 105 is assembled to the resin housings 104, variation in the side clearances of the resin valves 105 becomes large, in dependence upon dimensional accuracy of the resin housings 104 and the resin valves 105. Accordingly, the shims 111, 112 having various thicknesses need to be prepared correspondingly to the dimensional variation. The shims having the various thicknesses need to be selected in accordance with the dimensions of the resin valves 105 and the resin housings 104. Thus, the manufacturing cost of the integrated valve device further increases.

On the contrary, in the intake vortex generator of the integrated valve device, the valve units are assembled respectively to the fitting holes 10 of the cylindrical portions 5 of the intake manifold 1. The valves 2 are rotatable respectively in the intake passages 12 of the housings 6 of the valve units. The left and right wall portions 41, 42 of each housing 6 respectively have the sidewall surfaces 62 in the out-range. The sidewall surfaces 62 are respectively opposed to the left and right sidewall surfaces of the valves 2, and respectively defining the predetermined clearances. The protrusions 71, 72 are respectively provided to the sidewall surfaces 62 of the left and right wall portions 41, 42 for supporting each valve 2 by being in contact with the left and right sidewall surfaces of the valve 2.

The valve units are respectively assembled to the fitting holes 10 of the intake manifold 1. Subsequently, the valves 2 are rotated around the axial center of the valve shafts 21, 22 in the clockwise direction in FIG. 1A, so that each valve 2 is interposed between the protrusions 71, 72 in the out-range. Thus, the valves 2 are set at the valve position, when the pin rod 4 is inserted into the through holes 19 of the valves 2.

The pin rod 4 is inserted into the through holes 19 of the valves 2 in a condition where each valve 2 is interposed between the protrusions 71, 72 of the left and right wall portions 41, 42. Subsequently, the support portions 31 to 34 of the pin rod 4 are press-inserted to the valve shafts 21, 22. Thus, the valves 2 are skewered with the pin rod 4.

The protrusions 71, 72 are respectively provided to the sidewall surfaces 62 of the left and right wall portions 41, 42. The sidewall surfaces 62 are respectively opposed to the left and right sidewall surfaces of the valves 2 in the out-range. Each of the sidewall surfaces 61, 62 of the left and right wall portions 41, 42 and each of the left and right sidewall surfaces of the valve 2 therebetween define the side clearance. Each of the protrusions 71, 72 of the left and right wall portions 41, 42 has the height determined to be capable of substantially uniformize the side clearance between each sidewall surface 61, 62 and each sidewall surface of the valve 2.

Each valve 2 is rotated around the valve shafts 21, 22 in the anticlockwise direction in FIG. 1A, after assembling, e.g., press-inserting the support portions 31 to 34 of the pin rod 4 respectively to the valve shafts 21, 22 of the valves 2. Thus, each valve 2 is over-turned from the out-range into the open-close range through the full close position.

Thus, the left side clearance δl, which is on the left side with respect to the rotation axis, and the right side clearance δr, which is on the right side with respect to the rotation axis, are substantially uniformized to satisfy δl÷δr, that is, the left side clearance δl becomes substantially equal to the right side clearance δr.

Thus, both side clearances of each valve 2 can be uniformized, without inserting shims respectively into the clearances between the left and right sidewall surfaces of the valve 2 and the sidewall surfaces 61 of the left and right wall portions 41, 42.

In this structure and method, the valves 2 can be restricted from being eccentrically assembled with respect to the fitting holes 10 of the cylindrical portions 5 of the intake manifold 1. That is, the valves 2 can be restricted from being eccentrically assembled with respect to the intake passages 12 of the housings 6.

Furthermore, shims need not be inserted into the side clearances between the valves 2 and housings 6 before assembling the pin rod 4 to the valves 2. In addition, inserted shims need not be removed from the side clearances between the valves 2 and housings 6 after assembling the pin rod 4 to the valves 2. Thus, manufacturing works other than assembling works can be omitted, so that the manufacturing process can be simplified. In addition, alignment work of the axial position of each valve 2 can be reduced, so that efficiency in assembling of the pin rod 4 can be significantly enhanced.

Thus, man-hour needed for assembling of the valve units to the intake manifold 1 and fitting of the pin rod 4 to the through holes 19 of the valves 2 can be reduced, so that manufacturing cost can be reduced. Therefore, productivity of the intake vortex generator of the integrated valve device can be enhanced.

In the above structure and method, leakage of intake air passing through the side clearances in the valves 2 can be substantially uniformized when the valves 2 are in the full close position. When the valves 2 are in the full close position, for example, intake air leaking through the side clearances in the valves 2 may be directed to spray of fuel injected from injection holes of the injectors. In this case, atomization of fuel spray can be further enhanced using intake air leaking through the side clearances of the valves 2 in the full close position, so that an air assist operation can be produced. Thus, engine performance can be enhanced, and fuel consumption can be reduced.

Figure 4A:
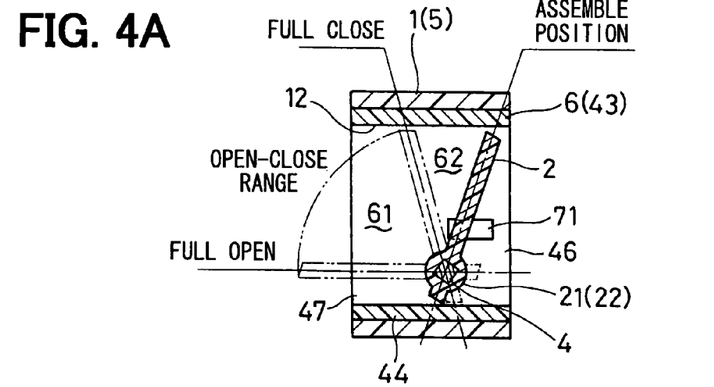
FIGS. 4A, 4B are sectional views each showing a valve member in a housing of a valve unit of an integrated valve device.
Figure 4B:
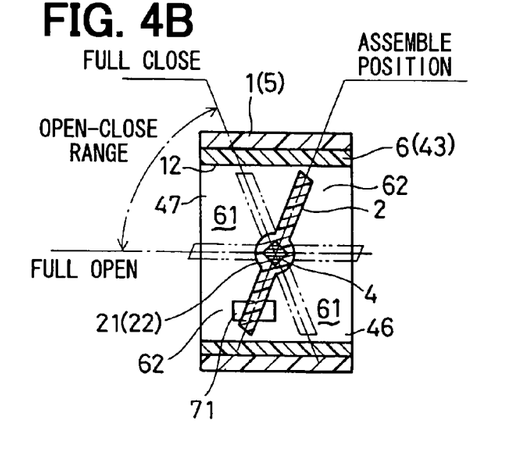
Figure 4C:
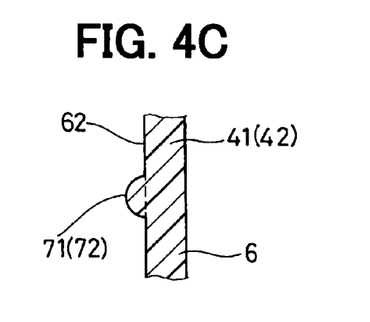
FIG. 4C is a sectional view showing a protrusion of a housing of a valve unit of an integrated valve device, according to the first embodiment.

As shown in FIG. 4B, each valve 2 may be a butterfly valve. In this case, the projections 71, 72 may be provided to the sidewall surfaces 62 in the vicinity of a vertical line perpendicular to the rotation axis defining the rotation center.

In this embodiment, each protrusion 71, 72 is in the substantially box shape as shown in FIG. 4A. Alternatively, as shown in FIG. 4B, at least one of the protrusions 71, 72 may be in a substantially semicircle shape in cross section. At least one of the protrusions 71, 72 may be in a hemisphere shape. In these structures, the height of each protrusion 71, 72 can be easily adjusted, so that the manufacturing work can be further facilitated. Thus, productivity of the intake vortex generator can be further enhanced.

Second Embodiment

Next, a manufacturing method for valve units of this embodiment is described with reference to FIGS. 5A to 6B.

Figure 5A:
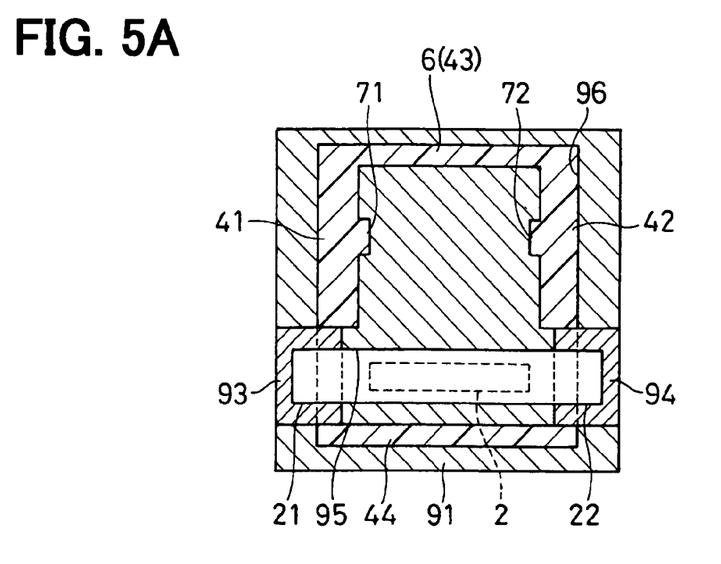
FIGS. 5A, 5B are sectional views each showing molding dies for injection molding of a valve ember, according to a second embodiment.
Figure 5B:
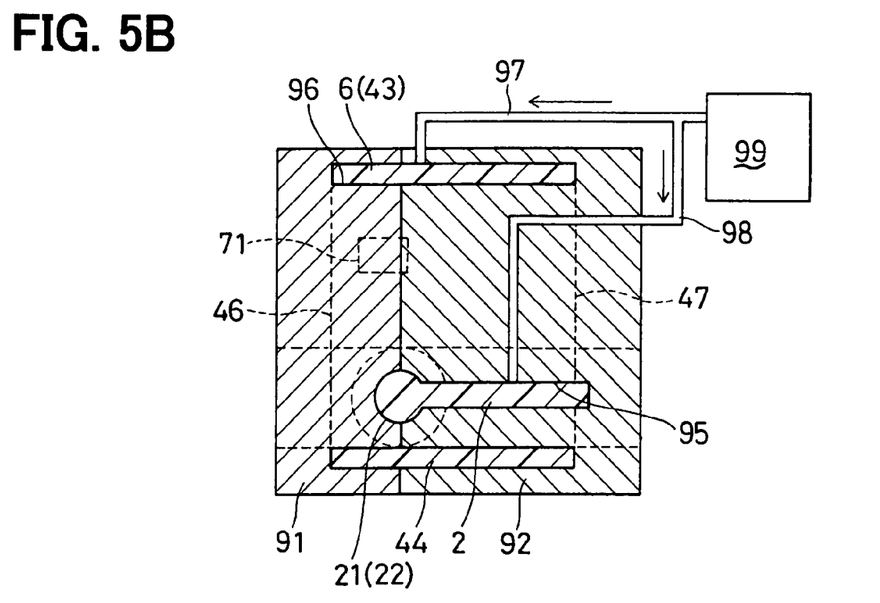

In this embodiment, molding dies are constructed of slide cores 91 to 94. The slide cores 91 to 94 define therein cavities 95, 96. Each cavity 95 is in a shape corresponding to the shape of a molded product of each valve 2 having the valve shafts 21, 22. Each cavity 96 is in a shape corresponding to the shape of a molded product of each housing 6 defining therein the intake passage 12 and the bearing holes 53, 54. A resin material supply device 99 is connected with the molding dies for supplying a resin material into the cavities 95, 96 through resin supply channels 97, 98.

In this embodiment, the valve 2, the valve shafts 21, 22, and the housing 6 are integrally and simultaneously molded to construct the valve unit by:

removing the slide cores 91, 92 respectively in the upstream and downstream directions along the axis of the intake passage 12; and removing the slide cores 93, 94 respectively from the valve shafts 21, 22 in axially opposite directions, in a condition where:

the valve 2 is in a full open poison in which the valve 2 extends substantially along the directions in which the slide core 91 is removed from the valve 2 toward the upstream of the intake air flow.

In this embodiment, the valve unit is injection-molded by the following method. The resin material supply device 99 charges the resin material into the molding dies through the resin supply channels 97, 98. Specifically, the resin material supply device 99 applies pressure to melting resin material, which is produced by heating resin pellets, thereby charging, i.e., injecting the melting resin material into the molding dies. The charged resin material is cooled in the molding dies, so that the cooled resin material as a resin product is detached from the molding dies by removing the molding dies from the resin product. More specifically, the resin material supply device 99 charges the resin material into the molding dies through the resin supply channels 97, 98, and charges the resin material into the cavities 95, 96, in an injection-charging process.

Figure 6A:
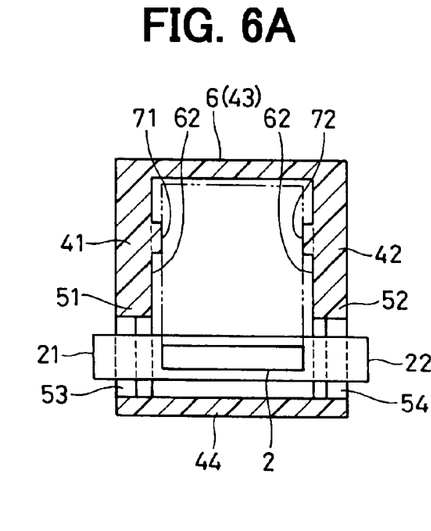
FIGS. 6A, 6B are sectional views each showing a valve unit including the valve member, according to the second embodiment.
Figure 6B:
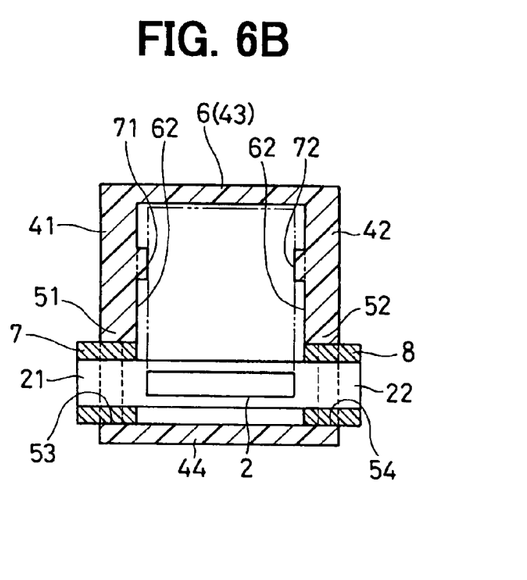

Subsequently, the cavities 95, 96 are maintained at predetermined pressure greater than charging pressure to which the resin material is increased in pressure. In this condition, cooling water is supplied through a water channel around the cavities 95, 96 simultaneously with applying the predetermined pressure to the melting resin in the molding dies. The resin material in the cavities 95, 96 shrinks by being cooled using the cooling water, and the resin material supply device 99 further supplies melting resin into the cavities 95, 96 through the resin supply channels 97, 98 correspondingly to the shrinkage of the resin material. Subsequently, the molding dies are removed from the resin material as a molded product, after cooling and solidifying the resin material in the molding dies using the cooling water. Thus, as shown in FIG. 6A, the molded product of the valve unit including the housing 6, which rotatably accommodates the valve 2 and the valve shafts 21, 22, is produced by integrally molding of the housing 6, the valve 2, and the valve shafts 21, 22.

In such a molding method, the valve shafts 21, 22 of the valve 2 axially protrude respectively from the left and right sidewall surfaces of the valve 2, and the valve shaft 21, 22 are rotatably accommodated in the bearing holes 53, 54 of the housing 6. Furthermore, the sidewall surfaces 62 of the left and right wall portions 41, 42 of the housing 6 are also formed in the simultaneously molding of the valve 2 and the housing 6. The protrusions 71, 72 of the sidewall surfaces 62 of the left and right wall portions 41, 42 of the housing 6 are also formed in the simultaneously molding of the valve 2 and the housing 6. The protrusions 71, 72 are formed by axially removing the slide cores 91, 92 in the upstream and downstream along the axial direction of the intake passage 12 in the simultaneously molding of the valve 2 and the housing 6.

The bearings 7, 8 are respectively fixed to the bearing portions 51, 52 of the housing 6, after detaching the molded product of valve unit from the molding dies. Specifically, the bearings 7, 8 are respectively press-inserted into the inner peripheries defining the bearing holes 53, 54 of the bearing portions 51, 52, so that the bearings 7, 8 are respectively fixed to the bearing portions 51, 52 in a bearing assembling process.

In this embodiment, the valves 2 and the housings 6 of the intake vortex generator of the integrated valve device are integrally molded simultaneously in the same, i.e., common molding dies. Therefore, each side clearance of the valve 2 and the height of each protrusion 71, 72 can be accurately and efficiently adjusted. Thus, the performance and the quality of the valve units each including the valve 2 and the housing 6 can be enhanced. In these structures, the height of each protrusion 71, 72 can be easily adjusted, so that the manufacturing work can be further facilitated. Thus, productivity of the intake vortex generator can be further enhanced.

In these structure and method, assembling work of the valve shafts 21, 22 of the valves 2 to the housings 6, other than the assembling of the bearings 7, 8, can be omitted by simultaneously molding the valves 2 and the housings 6 in the same common molding dies. Thus, manufacturing cost of the housing 6 can be reduced. Thus, manufacturing cost of the intake vortex generating device can be reduced. The structure in this embodiment can produce an effect similarly to the first embodiment.

(Modification)

The intake vortex generator may generate a horizontal swirl flow, instead of the vertical tumble flow described in the above embodiments, for accelerating combustion of mixture gas in the combustion chamber of each cylinder of the engine. The intake vortex generator may generate a squish vortex flow for accelerating combustion of mixture gas in the engine.

The integrated valve device in the above embodiments may be applied to a valve device for controlling intake air flowing into each combustion chamber of the engine. In this case, intake air control valves such as an idle speed control valve and a throttle valve may be provided to the housing of the valve device.

The integrate valve device may be applied to a variable intake control device for an engine having a variable intake valve. The variable intake valve is provided to an engine for variably control a cross section or a length of an intake passage of an intake manifold, in accordance with rotation speed of the engine. The variable intake control device is provided to an engine for enhancing torque of an output shaft of the engine, regardless of the rotation speed of the engine. Specifically, for example, the variable intake valve switches the intake passage to extend the intake passage in the manifold when the rotation speed of the engine is in a low or middle range. Alternatively, the variable intake valve switches the intake passage to shorten the intake passage in the manifold when the rotation speed of the engine is in a high range. The integrated valve device may control an amount of liquid such as water, oil, and fuel, in addition to gas such as intake air and exhaust gas.

The integrated valve device is not limited to being controlled using the electric actuator including the electric motor and the transmission device such as reduction gears. The integrated valve device may be controlled using an electromagnetic actuator or a negative pressure controlled actuator. In this case, the negative pressure controlled actuator may include a negative pressure control valve being electromagnetically controlled or electrically controlled. The integrated valve device may include a biasing member such as a spring for biasing the valves toward the valve-open direction or the valve-close direction.

The integrated valve device in the above embodiments may be applied to an intake device or an exhaust device of an engine having multiple cylinder banks, instead of being applied to an inline four-cylinder engine. The engine having multiple cylinder banks may be a multicylinder engine such as a v-type engine, a flat-type engine, and a horizontally-opposed engine. The integrated valve device is not limited to have a cantilever-structure. The integrated valve device may have a structure in which valves are supported from both axial ends.

The integrated valve device may have a normally close structure. In this case, the integrated valve device is energized to be in the full open position when the engine is in a normal operation, alternatively, the integrated valve device is de-energized to be in the full close position when the engine is started or the engine is in an idling operation. The integrated valve device may have a normally open structure. In this case, the integrated valve device is de-energized to be in the full open position when the engine is in a normal operation, alternatively, the integrated valve device is energized to be in the full close position when the engine is started or the engine is in an idling operation.

Each valve 2 may be in various shapes such as a circular shape, an oval shape, a rectangular shape, an oblong shape, and a polygonal shape. The shape of each intake passage 12 of the housing 6 is modified correspondingly to the shape of each of the valves 2.

In the above embodiments, the housings rotatably accommodate the valves respectively to construct valve units, and the valve units are arranged at predetermined distances in the intake manifold 1 along the pin rod 4. In this structure, the intake manifold 1 serves as a casing. Alternatively, an intake duct or an engine cover may be used as a casing. In this structure, specifically, the intake duct or the engine cover rotatably accommodates the valve units arranged at predetermined distances along the pin rod 9. In this case, the housing 6 can be omitted.

In the above embodiments, the protrusions 71, 72 are in a substantially box shape or a hemisphere shape. Alternatively, the protrusions 71, 72 may extend from the vertical line, which is perpendicular to the rotation axis of the valves 2, toward one of the inlet 46 and the outlet 47 of the housing 6 and gradually increase or decrease in height. The protrusions 71, 72 may be in a bent shape such as an arc-shape along the locus of the left and right sidewall surfaces of the valves 2 rotatable around the axial center of the valve shafts 21, 22 of the valves 2. The protrusions 71, 72 may be in a streamlined shape capable of reducing flow resistance of intake air when the valves 2 are in the full open position. The valves shafts 21, 22 may be integrated to be one cylindrical component having the outer diameter being substantially same as the outer diameter of the rotation axis of each valve 2.

Figure 3:
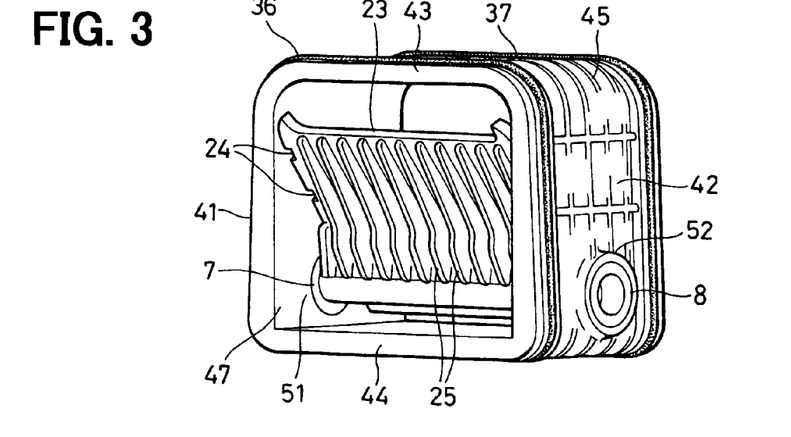
FIG. 3 is a perspective view showing a valve unit of the integrated valve device.

In the above embodiments, referring to FIGS. 1, 3, the upper wall portions 43 of the housings 6 are axially substantially flat. Alternatively, as show in FIG. 8B, the upper wall portions 43 of the housings 6 may respectively have notches (slits). In this structure, the housings 6 are elastically deformed after assembling the housings 6 into the fitting holes 10 of the intake manifold 1, so that the gap between the inner wall surface defining the fitting hole 10 of the intake manifold 1 and the outer wall surface of the housing 6 is reduced. In this structure, intake air passing through each intake passage 12 may flow toward each fitting hole 10 of the intake manifold 1 through the notch of each housing 6. However, even in this condition, the gaskets 36, 37 are capable of restricting leakage of the intake air to the outside of the intake manifold 1.

The number of the vales is not limited to four. The above structure and method can be applied to any other valve devices having at least one valve.

The valve device may have three valves and applied to one bank of V-6 engine.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An integrated valve device comprising:
   a casing having a plurality of passage portions each defining therein a fluid passage;
   a plurality of valves each accommodated in a respective one of the plurality of passage portions and being adapted to open and close the respective fluid passage; and
   a shaft adapted to simultaneously manipulating positions of the plurality of valves, wherein
   each of the plurality of valves has two sidewall surfaces with respect to a rotation axis thereof,
   each of the plurality of valves substantially closes the fluid passage when in a full close position,
   each of the plurality of valves substantially entirely opens the fluid passage when in a full open position,
   each of the plurality of passage portions has a pair of wall portions each opposed to a corresponding one of the two sidewall surfaces of each of the plurality of valves throughout an open-close range between the full close position and the full open position, and
   each of the pair of wall portions has an integrally formed protrusion for supporting a corresponding one of the plurality of valves by being in direct contact with a corresponding one of the sidewall surfaces when the protrusions of the pair of wall portions receive there between the respective one of the plurality of valves, each said protrusion having a thickness greater than a thickness of said respective wall portion around the protrusion.

2. The integrated valve device according to claim 1, wherein the protrusion has a height with respect to each of the pair of wall portions, and the height is determined such that the protrusion is capable of substantially uniformizing a gap axially between each of the pair of wall portions and corresponding one of the sidewall surfaces.

3. The integrated valve device according to claim 1, wherein each of the plurality of valves has a through hole through which the shaft extends along the rotation axis, and
the shaft has a plurality of fitting portions respectively being press-fitted to each of the plurality of valves via an inner periphery defining the through hole.

4. The integrated valve device according to claim 1, wherein the plurality of valves is formed of resin, and the plurality of passage portions is formed of resin.

5. A method for manufacturing an integrated valve device including:
   a casing having a plurality of passage portions each defining therein a fluid passage; a plurality of valves each accommodated in a respective one of the plurality of passage portions and being adapted to open and close the respective fluid passage; and a shaft adapted to simultaneously manipulating positions of the plurality of valves, wherein each of the plurality of valves has two sidewall surfaces with respect to a rotation axis thereof, each of the plurality of valves substantially closes the fluid passage when in a full close position, each of the plurality of valves substantially entirely opens the fluid passage when in a full open position, each of the plurality of passage portions has a pair of wall portions each opposed to a corresponding one of the two sidewall surfaces of each of the plurality of valves throughout an open-close range between the full close position and the full open position, and each of the pair of wall portions has an integrally formed protrusion for supporting a corresponding one of the plurality of valves by being in direct contact with a corresponding one of the sidewall surfaces when the protrusions of the pair of wall portions receive there between the respective one of the plurality of valves, each said protrusion having a thickness greater than a thickness of said respective wall portion around the protrusion, the method comprising:
   press-inserting the shaft into an inner periphery defining a through hole of the plurality of valves along the rotation axis in a condition where each of the plurality of valves is interposed between so as to directly contact the protrusions of the pair of wall portions,
   wherein the plurality of valves is skewered with the shaft.

6. The method according to claim 5, further comprising:
   simultaneously molding the plurality of passage portions and the plurality of valves of resin integrally in a common molding die,
   wherein each of the plurality of valves is rotatable relative to each of the plurality of passage portions.

7. The method according to claim 6,
wherein the simultaneously molding of the plurality of passage portions and the plurality of valves includes:
removing the molding die axially toward one of an upstream and a downstream of the fluid passage to form the protrusion.

8. An integrated valve device comprising:
   a casing having a plurality of passage portions each defining therein a fluid passage;
   a plurality of valves each accommodated in a respective one of the plurality of passage portions and being adapted to open and close the respective fluid passage; and a shaft defining a rotation axis around which the plurality of valves are integrally rotatable, wherein each of the plurality of valves has two sidewall surfaces, each of the plurality of passage portions has two wall portions each opposed to a corresponding one of the two sidewall surfaces of each of the plurality of valves throughout an open-close range between a full close position and a full open position of the plurality of valves, and each of the two wall portions has an integrally formed protrusion for supporting a corresponding one of the plurality of valves by being in direct contact with corresponding one of the sidewall surfaces, each said protrusion having a thickness greater than a thickness of said respective wall portion around the protrusion.

9. The integrated valve device according to claim 8, wherein each of the plurality of valves defines a minimum opening area in the fluid passage when the plurality of valves is in the full close position, and each of the plurality of valves defines a maximum opening area in the fluid passage when the plurality of valves is in the full open position.

10. A method for manufacturing an integrated valve device, the method comprising:

supporting a plurality of valves respectively in a plurality of cylindrical portions each defining a fluid passage by interposing each of the plurality of valves between a pair of protrusions each integrally formed with and projected from inner peripheries of each of the plurality of cylindrical portions and each said protrusion having a thickness greater than a thickness of said respective wall portion around the protrusion, such that each of the pair of protrusions is in direct contact with a corresponding one of the sidewall surfaces to support a corresponding one of the plurality of valves, the plurality of valves being in a range out of an open-close range between a full close position and a full open position of the plurality of valves; and press-inserting a shaft into an inner periphery defining a through hole of the plurality of valves along a rotation axis.

11. The method according to claim 10, wherein each of the plurality of valves defines a minimum opening area in the fluid passage when the plurality of valves is in the full close position, and each of the plurality of valves defines a maximum opening area in the fluid passage when the plurality of valves is in the full open position.

12. An integrated valve device comprising:

a casing having a plurality of passage portions each defining therein a fluid passage;

a plurality of valves each accommodated in a respective one of the plurality of passage portions and being adapted to open and close the respective fluid passage; and a shaft adapted to simultaneously manipulating positions of the plurality of valves, wherein each of the plurality of valves has two sidewall surfaces with respect to a rotation axis thereof, each of the plurality of valves substantially closes the fluid passage when in a full close position, each of the plurality of valves substantially entirely opens the fluid passage when in a full open position, each of the plurality of passage portions has a pair of wall portions each opposed to a corresponding one of the two sidewall surfaces of each of the plurality of valves throughout an open-close range between the full close position and the full open position, and each of the pair of wall portions has an integrally formed protrusion for supporting a corresponding one of the plurality of valves by being in contact with a corresponding one of the sidewall surfaces when the protrusions of the pair of wall portions receive there between the respective one of the plurality of valves, each said protrusion having a thickness greater than a thickness of said respective wall portion around the protrusion, wherein each of the plurality of valves has a through hole through which the shaft extends along the rotation axis, and the shaft has a plurality of fitting portions respectively being press-fitted to each of the plurality of valves via an inner periphery defining the through hole.

13. A method for manufacturing an integrated valve device including:

a casing having a plurality of passage portions each defining therein a fluid passage; a plurality of valves each accommodated in a respective one of the plurality of passage portions and being adapted to open and close the respective fluid passage; and a shaft adapted to simultaneously manipulating positions of the plurality of valves, wherein each of the plurality of valves has two sidewall surfaces with respect to a rotation axis thereof, each of the plurality of valves substantially closes the fluid passage when in a full close position, each of the plurality of valves substantially entirely opens the fluid passage when in a full open position, each of the plurality of passage portions has a pair of wall portions each opposed to a corresponding one of the two sidewall surfaces of each of the plurality of valves throughout an open-close range between the full close position and the full open position, and each of the pair of wall portions has an integrally formed protrusion having a thickness greater than a thickness of said respective wall portion around the protrusion, for supporting a corresponding one of the plurality of valves by being in contact with a corresponding one of the sidewall surfaces when the protrusions of the pair of wall portions receive there between the respective one of the plurality of valves, wherein each of the plurality of valves has a through hole through which the shaft extends along the rotation axis, and the shaft has a plurality of fitting portions respectively being press-fitted to each of the plurality of valves via an inner periphery defining the through hole, the method comprising:

press-inserting the shaft into an inner periphery defining a through hole of the plurality of valves along the rotation axis in a condition where each of the plurality of valves is interposed between the protrusions of the pair of wall portions, wherein the plurality of valves is skewered with the shaft.

14. The integrated valve device according to claim 1, wherein the shaft defines the rotation axis around which the plurality of valves are integrally rotatable, the protrusion supports the corresponding one valve by being in direct contact with the corresponding one sidewall surface throughout an open-close range between a full close position and a full open position of the plurality of valves.

15. The integrated valve device according to claim 14, wherein each of the plurality of valves defines a minimum opening area in the fluid passage when the plurality of valves is in the full close position, and each of the plurality of valves defines a maximum opening area in the fluid passage when the plurality of valves is in the full open position.

16. The integrated valve device according to claim 12, wherein the shaft defines the rotation axis around which the plurality of valves are integrally rotatable, the protrusion supports the corresponding one valve by being in contact with the corresponding one sidewall surface throughout an open-close range between a full close position and a full open position of the plurality of valves.

17. The integrated valve device according to claim 16, wherein each of the plurality of valves defines a minimum opening area in the fluid passage when the plurality of valves is in the full close position, and each of the plurality of valves defines a maximum opening area in the fluid passage when the plurality of valves is in the full open position.

* * * * *